United States Patent [19]

Turcotte et al.

[11] Patent Number: 5,277,883
[45] Date of Patent: Jan. 11, 1994

[54] RECOVERY OF METAL VALUES FROM AQUEOUS SOLUTIONS

[75] Inventors: Gilles R. Turcotte; Sherri A. Finlayson, both of Kingston, Canada

[73] Assignee: Rhone-Poulenc Chimie, Courbevoie, France

[21] Appl. No.: 959,530

[22] Filed: Oct. 13, 1992

Related U.S. Application Data

[63] Continuation of Ser. No. 514,275, Apr. 25, 1990, abandoned, which is a continuation-in-part of Ser. No. 304,353, Jan. 30, 1989, abandoned.

[30] Foreign Application Priority Data

Oct. 25, 1988 [CA] Canada .................................. 581227

[51] Int. Cl.$^5$ ...................... C01G 1/00; C01G 15/00; C01D 13/00; C01F 1/00
[52] U.S. Cl. ...................................... 423/112; 423/98; 423/109; 423/181; 423/DIG. 4; 423/89
[58] Field of Search ................. 423/112, 98, 109, 100, 423/181, DIG. 14; 204/105 R, 423/89

[56] References Cited

U.S. PATENT DOCUMENTS

| | | | |
|---|---|---|---|
| 3,890,427 | 6/1975 | Dewey et al. | 423/112 |
| 3,971,843 | 6/1976 | Helgorsky | 423/112 |
| 4,485,076 | 11/1984 | Bauer et al. | 423/112 |
| 4,559,203 | 12/1985 | Bauer et al. | 423/112 |

FOREIGN PATENT DOCUMENTS

| | | | |
|---|---|---|---|
| 0234319 | 2/1987 | European Pat. Off. | 423/112 |
| 59-213622 | of 1984 | Japan | 423/112 |

OTHER PUBLICATIONS

Chemical Engineers' Handbook 5th Edition, pp. 15-1-5-15-16 (1973)/Perry & Chilton.

Primary Examiner—David Brunsman
Attorney, Agent, or Firm—Burns, Doane, Swecker & Mathis

[57] ABSTRACT

A process is described for recovering metal values, e.g., gallium, contained in an aqueous solution by extraction comprising the steps of contacting the aqueous solution with a water immiscible organic phase comprising a water-insoluble substituted 8-hydroxyquinoline whereby the metal values are transferred into the organic phase; separating the organic phase from the aqueous solution and recovering the metal values from the organic phase. The novel feature comprises recovering the metal values by contacting the organic phase containing metal values with an aqueous solution of a strong base whereby metal values are removed from the organic phase to the aqueous solution with the aqueous solution containing the recovered metal values having a concentration of at least 4.6 moles per liter total hydroxide, and then separating the metal values from the aqueous phase.

10 Claims, No Drawings

RECOVERY OF METAL VALUES FROM AQUEOUS SOLUTIONS

CROSS-REFERENCE TO RELATED APPLICATION

This application is a continuation, of application Ser. No. 07/514,275, filed Apr. 25, 1990, now abandoned which is a continuation-in-part of U.S. application Ser. No. 07/304,353, filed Jan. 30, 1989, now abandoned.

BACKGROUND OF THE INVENTION

1. Field of the Invention

This invention relates to the recovery of metal values, e.g., gallium, from aqueous solutions by liquid-liquid and liquid-solid extraction.

2. Description of the Prior Art

It is well known in this art, e.g., from Helgorsky et al, U.S. Pat. No. 3,971,843, that gallium can be extracted from basic aqueous solutions, such as sodium aluminate solutions of the Bayer process, by solvent extraction with a substituted 8-hydroxyquinoline dissolved in organic solution. The standard practice for reextracting gallium from an organic solution is to contact the gallium with an aqueous solution of a mineral acid, e.g., hydrochloric, sulfuric or nitric acid. From a process point of view, the acidic re-extraction creates several problems:
  a) A high equilibrium acid concentration is required to favorably re-extract gallium from the organic phase, leading either to high acid consumption or to the need for acid recovering stages.
  b) The protonation of the substituted 8-hydroxyquinoline when contacted with strong acidic solutions, either increases the acid consumption or requires supplementary acid recovery stages.
  c) When gallium is initially extracted from Bayer liquor, any acid mixed with Bayer liquor results in the formation of salts detrimental to the Bayer process, thereby rendering the gallium extraction process less compatible with the host Bayer plant.

It has been suggested in European Patent Application No. 0 234 319, that it may be possible to re-extract gallium from the organic solution by contacting the gallium with a strong base, but no examples are given. Moreover, a concentration of 5 to 10 moles per liter is suggested.

It is an object of the present invention to circumvent the above problems by eliminating the need for acid extraction, thereby rendering the metal recovery process more compatible with the process and solutions used in a hydrometallurgical factory.

SUMMARY OF THE INVENTION

According to the present invention, it has been surprisingly discovered that metals can be effectively re-extracted from an organic complexant by contacting it with a concentrated aqueous solution of hydroxide rather than with an acidic solution. Thus, the present invention in its broadest aspect relates to a process for recovering metal values contained in aqueous solution by extraction comprising the steps of contacting the aqueous solution with a water immiscible organic phase comprising a water-insoluble substituted 8-hydroxyquinoline whereby the metal values are transferred into the organic phase; separating the organic phase from the aqueous solution and recovering the metal values from the organic phase, the improvement which comprises recovering the metal values by contacting the organic phase containing metal values with an aqueous solution of a strong base whereby metal values are removed from the organic phase to the aqueous solution. The aqueous solution containing the recovered metal values has a concentration of at least 4.6 moles per liter total hydroxide. The metal values are then further separated from the aqueous phase.

DETAILED DESCRIPTION OF THE PREFERRED EMBODIMENTS OF THE INVENTION

By the expression "total hydroxide" as utilized herein is intended as meaning the sum of the free hydroxide plus combined hydroxide attached to such ions as $Al(OH)_4^-$, $Ga(OH)_4^-$, $Zn(OH)_3^-$ and the like.

For the most effective recovery of metal values from the organic phase, it is preferable to control the concentration of total hydroxide such that the aqueous solution containing the recovered metal values has a concentration of at least 7.5 moles per liter total hydroxide. It is also preferred to contact the organic phase containing metal values with an aqueous solution of a strong base containing at least 10 moles per liter, and as much as 19.3 moles per liter, total hydroxide. The strong base is preferably NaOH or KOH.

It is further preferred to carry out the preliminary extraction from aqueous solutions and recovery of metal values from the organic phase, with minimum exposure to air or other oxidizing agents by using a mixer-settler which is sufficiently gas tight so that the entry of gases is prevented or considerably reduced. A settler which is suitable for this purpose is disclosed in French Patent Application Publication No. 2,599,989.

A wide variety of metal values, such as Na, Ga, Al, Zn and Ge, may be recovered from aqueous solutions using the process of this invention. The aqueous solutions may be acidic or basic and the extractant is preferably an 8-hydroxyquinoline substituted with either a saturated or unsaturated side chain. Among preferred extractants, there may be mentioned LIX-26 ®, available from Henkel Corporation and KELEX 100 ®, KELEX 108 ®, available from Schering AG.

In the process of the present invention, the metal values are stripped from an organic phase either in the form of an organic solution or in the form of an organic phase immobilized on a solid support, such as a resin or charcoal.

The process is of particular interest for recovering gallium and during contact between the organic phase and the aqueous phases, gallium is transferred between the phases by an ion-exchange reaction such as:

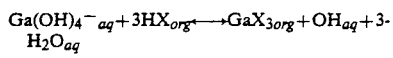

where HX represents substituted 8-hydroxyquinoline. According to the chemical equation above, low hydroxide concentrations in the aqueous solution will favor gallium transfer to the organic phase, while high hydroxide concentrations will favor transfer to the aqueous solution.

Advantageously, the organic phase from which gallium values are extracted with a strong basic solution, is recycled in the step of recovering gallium from the sodium aluminate solution. Previous to recycling, the organic phase is first washed with a weak basic solution. By washing the organic phase impurities or other compounds produced during the extracting cycle are eliminated and the organic solution is neutralized. Washing the organic phase also improves the gallium extraction performance in recovering gallium from the sodium aluminate solution.

The standard industrial practice for recovering metal values, such as gallium, from aqueous solutions is to electrolyze the caustic solution. The extraction process of the present invention can also be operated to allow direct electrolysis of the re-extraction solution to recover metallic gallium. The spent electrolyte can then be re-causitified and partly recirculated to re-extract gallium values from the organic phase in the liquid-liquid or liquid-solid extraction process.

In another embodiment of the present invention, the spent electrolyte may be diluted to reduce the hydroxide concentration and is further contacted with the organic phase containing metal values, prior to re-extracting gallium with a strong basic solution. This feature permits a greater recovery of the residual gallium values contained in the spent electrolyte and increases the gallium concentration in the organic phase and aqueous phase submitted to electrolysis.

The spent electrolyte is sufficiently diluted to obtain a low hydroxide concentration which favors the transfer of gallium to the organic phase.

In order to further illustrate the present invention and the advantages thereof, the following specific examples are given, it being understood that the same are intended only as illustrative and in nowise limitative.

In the following examples, the extracting agent used was LIX-26 ®, a commercially available extractant composed of approximately 72% w/w of a mixture of unsaturated substituted 8-hydroxyquinolines. The organic solution also contained some isodecanol and Iso-par-M (a kerosene type diluent). In some cases, the organic solution also contained some unidentified contaminants originating from the previous use of the organic solution.

EXAMPLE 1

225 ml of an organic solution containing approximately 5% v/v LIX-26 ® (that contained contaminants originating from the previous use of the organic solution), was contacted with 900 ml of a sodium aluminate solution originating from the Bayer process. The sodium and aluminum content in the liquor was approximately 110 g/l Na and 25 g/l Al. During contact with the organic phase, the gallium content of the sodium aluminate liquor decreased from 147 ppm to 84 ppm. After separating the phases, 70 ml aliquots of the gallium containing organic solution were contacted with 70 ml aliquots of aqueous solutions containing respectively 7.5, 10 and 12.5 moles per liter of total hydroxide as NaOH. Analysis of these caustic solutions after contact was respectively 231 ppm, 264 ppm and 267 ppm, demonstrating that the re-extraction was almost 100% complete.

EXAMPLE 2

350 ml of an organic solution containing approximately 6% v/v LIX-26 ® contacted with 1400 ml of a sodium aluminate solution originating from the Bayer process. The sodium and aluminum content in the solution was approximately 100 g/l Na and 24 g/l Al. During contact with the organic phase, the gallium content on the sodium aluminate solution decreased from 135 ppm to 77 ppm. After separating the phases, a 300 ml aliquot of the gallium containing organic solution was contacted with a 10 ml aliquot of an aqueous solution containing 10 moles per liter of total hydroxide as NaOH. Analysis of the caustic solution after contact with the organic solution showed that the gallium content was 4840 ppm, demonstrating that a solution of high gallium concentration can be obtained by re-extraction with a concentrated basic aqueous solution.

EXAMPLE 3

13 liters of an organic solution containing approximately 4% v/v LIX-26 ® (that contained contaminants originating from the previous use of the organic solution) with a gallium, aluminum and sodium content of approximately 157 ppm Ga, 260 ppm Al and 1.25 g/l Na was contacted with a 520 ml aliquot of an aqueous solution containing 10 moles per liter total hydroxide as NaOH. Analysis of the caustic solution after contact with the organic solution resulted in a gallium content of 2940 ppm. A 400 ml aliquot of this caustic solution was electrolyzed. During electrolysis, the gallium content in the caustic solution decreased from 2940 ppm to 1240 ppm, demonstrating that metallic gallium can be recovered directly from a concentrated basic aqueous solution in a process for reextracting gallium.

EXAMPLE 4

1000 ml of an organic solution containing approximately 2.45% v/v LIX-26 ® (that contained contaminants originating from the previous use of the organic solution) with aluminum and sodium contents of approximately 625 ppm Al and 4.02 g/l Na was contacted with a 4 ml aliquot of an aqueous solution containing 10 moles per liter total hydroxide.

Analysis of the caustic solution after contact with the organic solution resulted in an aluminum and sodium content of 21.4 g/l Al and 115 g/l Na. The total hydroxide content of the caustic solution after contact with the organic solution was 4.6 moles per liter. This example demonstrates that metal values can be re-extracted with an aqueous solution containing a strong base. The aqueous solution containing the recovered metal values may have a concentration of at least 4.6 moles per liter total hydroxide.

EXAMPLE 5

75 ml aliquots of an organic solution containing approximately 2.45% v/v LIX-26 ® (that contained contaminants originating from the previous use of the organic solution) with gallium, aluminum and sodium contents of approximately 77 ppm Ga, 625 ppm Al and 4.02 g/l Na were contacted with 75 ml aliquots of aqueous solutions of sodium hydroxide and potassium hydroxide, respectively, containing 12 moles per liter total hydroxide. Analysis of these caustic solutions after contact with the organic solution resulted in a gallium content of 78 ppm and 79 ppm respectively, demonstrating that re-extraction of gallium from the organic solution with a strong base is not limited to a specific base.

EXAMPLE 6

750 ml aliquots of an organic solution containing approximately 2.45% v/v LIX-26 ® (that contained contaminants originating from the previous use of the organic solution) with gallium, aluminum and sodium contents of approximately 77 ppm Ga, 625 ppm Al and 4.02 g/l Na were contacted with 5 ml aliquots of aqueous solutions of sodium hydroxide containing respectively 12.50, 16.25 and 19.3 moles per liter total hydroxide. Analysis of these caustic solutions after contact with the organic solution resulted in a gallium content of 374 ppm, 722 ppm, and 1646 ppm respectively. The aluminum content of the caustic solutions was respectively 22.67 g/l, 23.75 g/l and 24.91 g/l. This example demonstrates that metal values can be re-extracted from the organic solution with an aqueous solution containing a strong base and that the concentration of the re-extracted metal values can be increased by increasing the concentration of total hydroxide in the re-extraction solution.

EXAMPLE 7

100 ml of an organic solution containing approximately 6% v/v LIX-26 ® was contacted with 100 ml of an aqueous solution having a pH of approximately 2.0. The gallium and sodium content in the aqueous solution was approximately 467 ppm Ga and 710 ppm Na. During contact with the organic solution, the gallium content in the aqueous solution decreased from 467 ppm to 0.5 ppm. After separating the phases, a 50 ml aliquot of gallium containing organic solution was contacted with a 50 ml aliquot of an aqueous solution containing 10 moles per liter total hydroxide.

Analysis of the caustic solution after contact with the organic solution resulted in a gallium content of 532 ppm, demonstrating that gallium values contained in an acidic aqueous solution can be extracted by the organic solution. Also, the same gallium values contained in the organic solution can be re-extracted from the organic solution with an aqueous solution containing a strong base.

EXAMPLE 8

350 ml of an organic solution containing approximately 6% v/v KELEX 100 ® was contacted with 350 ml of an aqueous solution containing approximately 140 g/l sodium hydroxide and 1 g/l gallium. During contact with the organic solution, the gallium content in the aqueous solution decreased from 1 g/l to 93 ppm. After separating the phases, a 300 ml aliquot of the gallium containing organic solution was contacted with a 15 ml aliquot of an aqueous solution containing 12.5 moles per liter total hydroxide.

Analysis of the caustic solution after contact with the organic solution resulted in a gallium content of 17.8 g/l, demonstrating that a solution containing a high gallium concentration can be achieved by re-extraction with a substituted 8-hydroxyquinoline other than LIX-26 ®, with an aqueous solution containing a strong base.

EXAMPLE 9

50 ml aliquots of an organic solution containing approximately 6% v/v LIX-26 ® were contacted with 50 ml aliquots of aqueous solutions containing approximately 2470 ppm Zn and 2497 ppm Ge, respectively.

The pH of the aqueous solution was approximately 3.75. During contact with the organic solutions, the zinc content in the aqueous solution decreased from 2470 to 2378 ppm, and the germanium content in the aqueous solution decreased from 2497 to 2048 ppm.

After separating the phases, 30 ml aliquots of the zinc and germanium containing organic solutions were contacted with 30 ml aliquots of an aqueous solution containing 10 moles per liter total hydroxide. Analysis of these caustic solutions after contact with the organic solutions resulted in a zinc content of 23 ppm and a germanium content of 455 ppm.

This example illustrates that the metal values contained in acidic aqueous solutions can be extracted with the organic solution and that these same metal values contained in the organic solution can be re-extracted from the organic solution with an aqueous solution of a strong base of least 10 moles per liter total hydroxide.

EXAMPLE 10

800 ml of an organic solution containing approximately 10% v/v LIX-26 ® was contacted with 800 ml of an aqueous solution containing approximately 11.1 g/l gallium and 140 g/l sodium hydroxide. During contact with the organic solution, the gallium content in the aqueous solution decreased from 11.1 g/l to 7.4 g/l. After separating the phases, a 750 ml aliquot of the gallium containing organic solution was contacted with a 5 ml aliquot of an aqueous solution containing 10 moles per liter of total hydroxide as NaOH. Analysis of the caustic solution after contact with the organic solution resulted in gallium and sodium contents of 70.89 g/l Ga and 112 g/l Na. The total hydroxide content of the caustic solution after contact with the organic solution was 4.4 moles per liter. This example demonstrates that gallium values can be recovered from the organic solution with a concentrated basic aqueous solution. The aqueous solution containing the recovered gallium values may have a concentration of at least 4.4 moles per liter total hydroxide.

EXAMPLE 11

50 ml aliquots of an organic solution containing approximately 5% v/v LIX-26 ® was contacted with 50 ml aliquots of an aqueous solution containing 10 moles per liter total hydroxide for 72 hours at 55° C.

25 ml aliquots of the organic solution, prior to contact with the 10 moles per liter total hydroxide solution (I) and after contact with 10 moles per liter total hydroxide solution (II) were contacted with 75 ml aliquots of an aqueous solution containing approximately 1.09 g/l gallium and 130 g/l sodium hydroxide. During contact with organic solution (I), the gallium content of the aqueous solution decreased from 1.09 g/l to 0.66 g/l. During contact with organic solution (II), the gallium content decreased from 1.09 g/l to 0.81 g/l. The gallium and sodium content in organic solution (I) was 1.24 g/l Ga and 1.21 g/l Na, and in organic solution (II) was 0.85 g/l Ga and 1.63 g/l Na. This example demonstrates that contact of the organic solution with a strong basic aqueous solution decreases the gallium extraction performance.

EXAMPLE 12

600 ml of an organic solution containing approximately 4.6% v/v LIX-26 ® (that contained contaminants originating from the previous use of the organic solution) was contacted with 600 ml of an aqueous solution containing 0.175 moles per liter total hydroxide for one hour at 45° C. The organic solution was further contacted successively with three fresh aliquots of an aqueous solution containing 0.175 moles per liter total hydroxide.

75 ml aliquots of the organic solution, prior to contact with 0.175 mole per liter total hydroxide solution (I) and after contact with 0.175 mole per liter total hydroxide solution (II) were contacted with 75 ml aliquots of a sodium aluminate solution originating from the Bayer process. The sodium and aluminum content in the solution was approximately 105 g/l Na and 38 g/l Al. During contact with the organic solution (I), the gallium content in the sodium aluminate solution decreased from 100 ppm to 56 ppm. During contact with organic solution (II), the gallium content decreased from 100 ppm to 51 ppm. The gallium, aluminum and sodium content in the organic solution (I) was 43 ppm Ga, 410 ppm Al and 6.38 g/l Na; and the content in organic solution (II) was 49 ppm Ga, 350 ppm Al and 4.07 g/l Na. This example demonstrates that contact of the organic solution with weak basic aqueous solutions improves gallium extraction performance.

EXAMPLE 13

Various organic solutions containing some LIX-26®, a commercially available extractant composed of approximately 72% w/w of a mixture of unsaturated substituted 8-hydroxyquinolines have been used in the present invention. The organic solutions also contained some isodecanol and Isopar-M (a kerosene type diluent). In some cases, the organic solution also contained some unidentified contaminants originating from the previous use of the organic solution.

555 ml of an organic solution containing approximately 4.6% v/v LIX-26® (that contained contaminants originating from the previous use of the organic solution) with a gallium, aluminum and sodium content of approximately 50 ppm Ga, 530 ppm Al and 7.7 g/l Na was contacted with 69 ml of dilute spent electrolyte. During contact with the organic phase the gallium, aluminum, and sodium content in the dilute spent electrolyte decreased from 1083 ppm Ga, 3.6 g/l Al, and 49.45 g/l Na to 41 ppm Ga, 7.26 g/l Al, and 64.84 g/l Na. Analysis of the organic solution after contact with the dilute spent electrolyte resulted in a gallium content of 176 ppm. This example demonstrates that gallium can be recovered by solvent extraction from diluted spent electrolytes and that the concentration of gallium in the organic phase is increased.

What is claimed:

1. A method for recovering metal values contained in an aqueous solution by extraction, said method comprising the steps of:
   (a) contacting the aqueous solution with a water immiscible organic phase comprising a water-insoluble substituted 8-hydroxyquinoline whereby the metal values are transferred into the organic phase;
   (b) separating the organic phase from the aqueous solution;
   (c) contacting the organic phase containing metal values with a concentrated basic aqueous solution whereby metal values are removed from the organic phase to the concentrated basic aqueous phase with the concentrated basic aqueous phase containing the recovered metal values having a concentration of at least 4.6 moles per liter of total hydroxide;
   (d) washing the organic phase with a weak basic solution before recycling the washed organic phase to step (a); and
   (e) separating the metal values from the concentrated basic aqueous phase.

2. The method according to claim 1, wherein the aqueous phase containing the recovered metal values has a concentration of at least 7.5 moles per liter of total hydroxide.

3. The method according to claim 1, wherein the organic phase containing metal values is contacted with a concentrated aqueous solution of a base containing at least 10 moles per liter of total hydroxide.

4. The method of claim 1, wherein the aqueous solution is a sodium aluminate solution derived from the production of alumina by the Bayer process.

5. The method of claim 1, wherein the metal values are selected from the group consisting of Na, Ga, Al, Zn and Ge.

6. The method of claim 1, wherein the metal value is gallium.

7. The method of claim 1, wherein the metal values are recovered from an organic phase in the form of an organic solution.

8. The method of claim 1, wherein the metal values are recovered from an organic phase immobilized on a solid support.

9. The method of claim 1, wherein the metal values are gallium values and the gallium values are recovered and separated as gallium metal by electrolyzing the aqueous phase containing the gallium values.

10. The method of claim 9, wherein prior to recovering the metal values by contacting the organic phase with a concentrated aqueous solution of a base, said organic phase containing metal values is contacted with a spent electrolyte from electrolyzing step, after diluting thereof.

* * * * *